US008415904B2

(12) United States Patent  
Rippel (10) Patent No.: US 8,415,904 B2
(45) Date of Patent: Apr. 9, 2013

(54) OPEN DELTA MOTOR DRIVE WITH INTEGRATED RECHARGE

(75) Inventor: Wally E. Rippel, Altadena, CA (US)

(73) Assignee: AC Propulsion, Inc., San Dimas, CA (US)

( * ) Notice: Subject to any disclaimer, the term of this patent is extended or adjusted under 35 U.S.C. 154(b) by 379 days.

(21) Appl. No.: 12/826,611

(22) Filed: Jun. 29, 2010

(65) Prior Publication Data

US 2011/0316461 A1 Dec. 29, 2011

(51) Int. Cl.
*H02P 1/00* (2006.01)

(52) U.S. Cl.
USPC ....... 318/139; 318/400.27; 318/440; 318/497

(58) Field of Classification Search .......... 318/139, 318/105, 440, 497, 701, 801, 803, 771, 400.27; 363/37, 98; 180/65.1; 307/9.1, 10.1
See application file for complete search history.

(56) References Cited

U.S. PATENT DOCUMENTS

| | | | |
|---|---|---|---|
| 4,920,475 A | | 4/1990 | Rippel |
| 5,099,186 A | * | 3/1992 | Rippel et al. ................. 318/803 |
| 5,291,388 A | * | 3/1994 | Heinrich ....................... 363/98 |
| 5,811,905 A | * | 9/1998 | Tang .............................. 310/179 |
| 5,914,590 A | | 6/1999 | Wacknov et al. |
| 5,929,590 A | * | 7/1999 | Tang .............................. 318/701 |
| 6,232,742 B1 | | 5/2001 | Wacknov et al. |
| 6,242,884 B1 | * | 6/2001 | Lipo et al. ..................... 318/808 |
| 6,598,574 B2 | * | 7/2003 | Osada et al. ................. 123/179.1 |
| 7,800,331 B2 | * | 9/2010 | Chakrabarti et al. ......... 318/440 |
| 7,847,437 B2 | * | 12/2010 | Chakrabarti et al. ........... 307/82 |
| 7,956,563 B2 | * | 6/2011 | Perisic et al. ................. 318/440 |
| 7,990,098 B2 | * | 8/2011 | Perisic et al. ................. 318/801 |
| 8,002,056 B2 | * | 8/2011 | Chakrabarti et al. ...... 180/65.22 |
| 8,054,032 B2 | * | 11/2011 | Chakrabarti et al. ......... 318/801 |
| 8,058,830 B2 | * | 11/2011 | John et al. .................... 318/440 |
| 2003/0048005 A1 | | 3/2003 | Goldin et al. |
| 2005/0002210 A1 | * | 1/2005 | Moon et al. ..................... 363/37 |
| 2005/0088146 A1 | | 4/2005 | Faunce et al. |
| 2007/0120520 A1 | * | 5/2007 | Miyazaki et al. ............. 318/801 |
| 2008/0258661 A1 | * | 10/2008 | Nagashima et al. ..... 318/400.29 |
| 2009/0032316 A1 | * | 2/2009 | Chakrabarti et al. ........ 180/65.1 |
| 2009/0033156 A1 | * | 2/2009 | Chakrabarti et al. ........... 307/82 |
| 2009/0033251 A1 | * | 2/2009 | Perisic et al. ................. 318/105 |
| 2009/0033253 A1 | * | 2/2009 | Nagashima et al. .......... 318/139 |

(Continued)

OTHER PUBLICATIONS

International Search Report and Written Opinion for International Application No. PCT/US2011/042208, mailed Nov. 1, 2011.

*Primary Examiner* — Paul Ip
(74) *Attorney, Agent, or Firm* — Nixon Peabody LLP (57) ABSTRACT

An integrated motor drive and battery recharge apparatus includes a battery, an electric motor having N separate motor windings each having a first and a second leg, a contactor having a plurality M of poles, each pole having a first side and a second side, the inverter having 2N switching poles and a capacitor each coupled in parallel with the battery, and PWM control circuitry configured to control the state of each switching pole. Each leg of each motor winding is coupled to a phase node of a corresponding inverter switching pole, at least two of the motor winding legs (or taps thereof) are coupled to the corresponding first sides of the contactor poles, a power source/sink is coupled to the corresponding second sides of the contactor poles, and in one aspect a capacitor is coupled between each pair of contactor poles.

26 Claims, 11 Drawing Sheets

U.S. PATENT DOCUMENTS

| | | | |
|---|---|---|---|
| 2009/0033255 A1* | 2/2009 | John et al. | 318/139 |
| 2009/0033274 A1* | 2/2009 | Perisic et al. | 318/771 |
| 2009/0034303 A1* | 2/2009 | Chakrabarti et al. | 363/71 |
| 2009/0134828 A1* | 5/2009 | Chakrabarti et al. | 318/440 |
| 2010/0071970 A1* | 3/2010 | Welchko et al. | 180/65.1 |
| 2011/0234139 A1* | 9/2011 | Hsu | 318/497 |
| 2012/0032622 A1* | 2/2012 | Lipo | 318/400.27 |

\* cited by examiner

OPEN DELTA MOTOR DRIVE WITH INTEGRATED RECHARGE

TECHNICAL FIELD

The present disclosure relates generally to integrated inverter/charger circuits for electrically powered vehicles.

BACKGROUND

Figure 1:
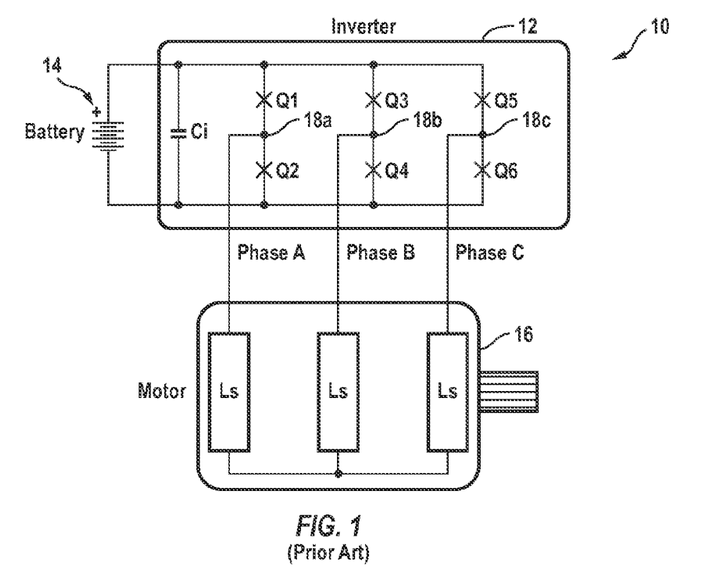
FIG. 1 is an electrical schematic drawing showing the basic combination of a three-phase inverter and a three-phase motor in accordance with the prior art.

FIG. 1 is an electrical schematic drawing showing the basic combination of a three-phase bridge inverter and a three-phase motor to form a drive circuit 10 for an electrically powered vehicle. The circuit 10 of FIG. 1 includes a three phase bridge inverter 12 (including a DC bus input capacitor Ci), a battery 14, and a three phase motor 16. The inverter is formed from six transistors arranged as three pairs of switches: Q1 and Q2, Q3 and Q4, and Q5 and Q6, each forming a switching pole with a corresponding phase node (18a, 18b, 18c) at its center. Each phase (Phase A, Phase B, Phase C) provides power from the inverter 12 to the motor 16 and is coupled to a corresponding phase node.

Figure 2:
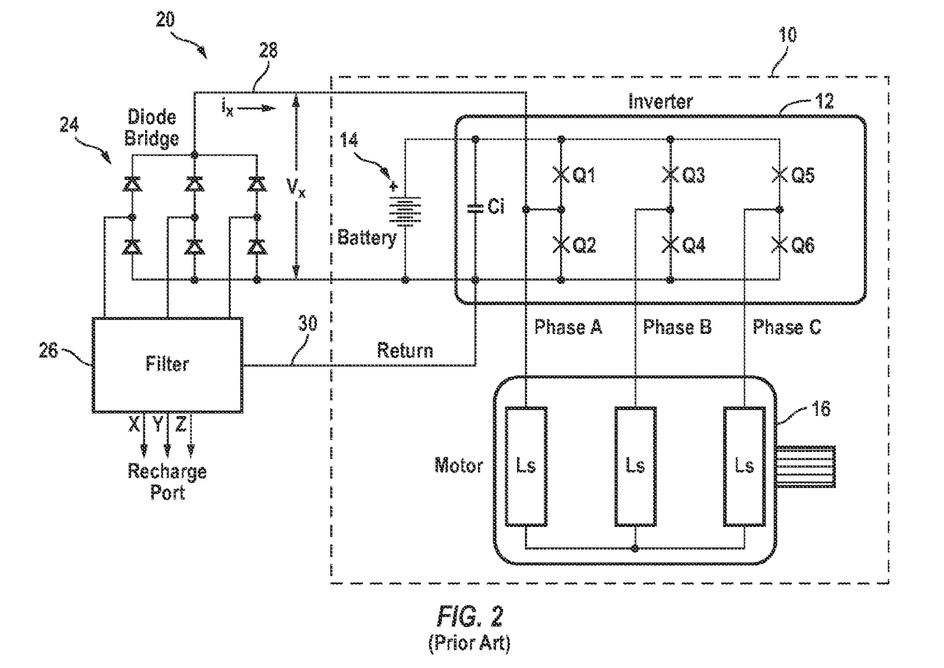
FIG. 2 is an electrical schematic drawing showing an integrated recharge scheme using a diode bridge in accordance with the prior art.
Figure 3:
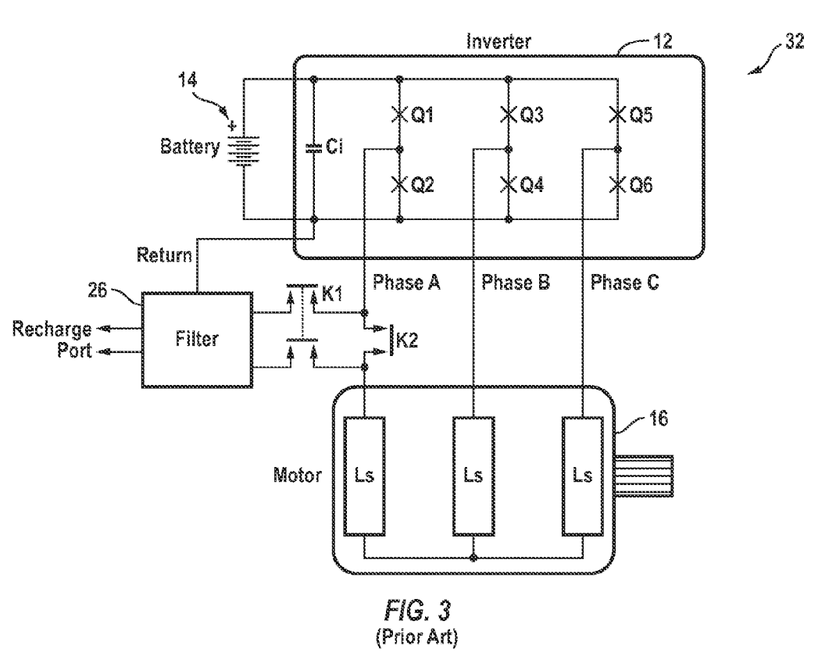
FIG. 3 is an electrical schematic diagram showing an integrated recharge scheme which uses a contactor to open one phase leg in accordance with the prior art.
Figure 4:
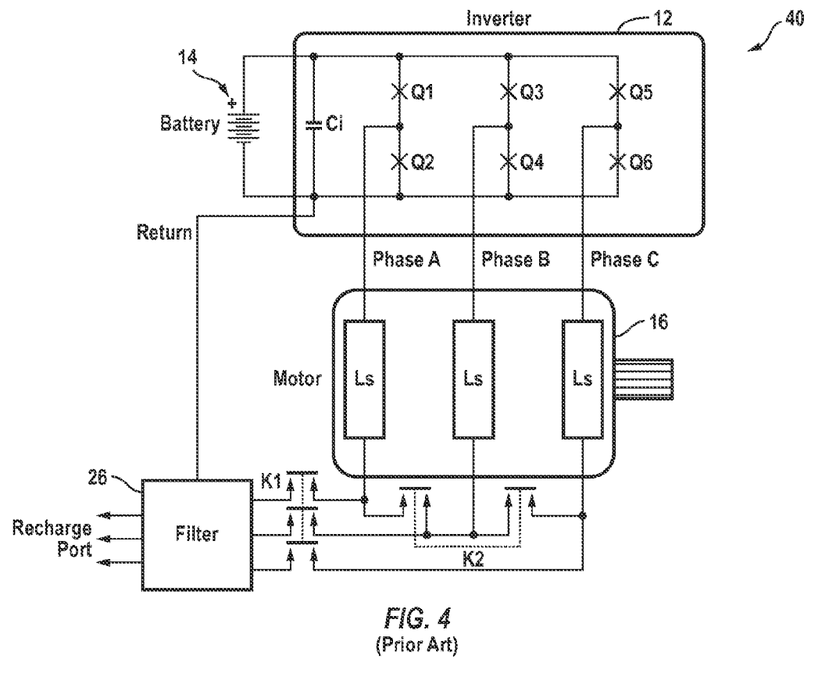
FIG. 4 is an electrical schematic diagram showing an integrated recharge scheme with a two-pole contactor to open motor neutral "splice" in accordance with the prior art.

Three existing transformerless integrated drive-recharge schemes are known in the art as illustrated in FIGS. 2, 3 and 4. For each of these schemes, the starting point is the combination of a three-phase, voltage-fed inverter coupled with a three-phase motor as shown in FIG. 1. In each scheme, the motor type may be induction, brushless permanent magnet, or a synchronous reluctance. In each scheme, switch-mode power conversion with boost-mode action is used during recharge. The motor winding is used as an inductive circuit element. Accordingly, for each of these schemes, the peak of the input recharge voltage must be less than the battery voltage.

FIG. 2 is an electrical schematic drawing showing an integrated recharge circuit 20 using a diode bridge.

With the FIG. 2 scheme, a diode bridge 24 and conventional EMI (electromagnetic interference) filter/recharge port 26 are added to the FIG. 1 inverter-motor 10 to provide the recharge function. Diode bridge 24 and filter 26 are coupled to inverter-motor 10 with lines 28 and 30 (ground line G). When operated in the drive-mode, each of the diodes within diode bridge 24 remain back-biased at all times thus effectively disconnecting filter 26 from the inverter-motor combination and thereby preventing unwanted currents within filter 26 during drive-mode operation.

When operated in recharge-mode, input power (single-phase or three-phase) is rectified by diode bridge 24 to provide a pulsating DC (Direct Current) voltage source. In turn, this voltage source is then boosted to deliver power to battery 14. The boost action is provided by conventional pulse width modulation (PWM) control of semiconductor switches Q3 through Q6 in combination with inductance provided by the motor windings. Switches Q1 and Q2 remain off during the recharge-mode. Control of Q3 through Q6 can be such that odd-numbered current harmonics within the DC bus cancel—thus minimizing losses within capacitor Ci.

By using a control function where current $i_x$ is maintained proportionate to voltage $v_x$, recharge power factor is optimized. With single-phase power, near unity power factor can be maintained and where three-phase power is used, the power factor degrades only to approximately 96%.

Maximum recharge power is typically established by the motor rating. For single-phase operation with this approach, the maximum continuous recharge power is approximately one half of the continuous drive-mode rating. For three-phase operation, the continuous rating jumps to about 70% of the continuous drive rating.

The scheme shown in FIG. 2 is advantageous in that it provides elimination of contactors, insurance of uni-directionality (power cannot return to the utility), and ability to operate from any AC (Alternating Current) power source (such as a utility) having a peak voltage lower than the battery voltage. Some disadvantages of this approach include the addition of cost and power loss due to the diode bridge, inability to control reactive power, inability to provide bidirectional operation (returning power to the utility), degradation of power factor when operated with three-phase power input, and presence of a high common-mode voltage between line 30 (the return) and the time average of lines X, Y and Z. Because the size of the common-mode filter is proportionate to the common-mode voltage, this means that a moderately large common-mode filter must be used to prevent unwanted common-mode line currents.

FIG. 3 is an electrical schematic diagram showing an integrated recharge scheme 32 which uses a contactor K2 to open one phase leg. With this scheme, two contactors (K1, K2) and a conventional EMI filter/recharge port 26 are added to the FIG. 1 inverter-motor 10 to provide the recharge function. When operated in the drive-mode, contactor K1 is open and contactor K2 is closed—thus reestablishing the FIG. 1 configuration.

In the recharge-mode, K1 is closed and K2 is open, while Q1 through Q4 provide synchronous rectification; motor leakage inductance inherent in the motor is used to provide the required phase port inductance. Various PWM control schemes can be employed. In one scheme, control is such that line current is maintained instantaneously proportionate to line voltage—thus providing unity power factor operation.

As before, maximum recharge power is usually determined by the motor rating. Typically, the maximum continuous recharge power with this approach is approximately one half of the continuous drive-mode rating.

Advantages of the FIG. 3 scheme include elimination of added semiconductor components (e.g., the diode bridge 24 from the FIG. 2 scheme), ability to operate from any utility having a peak voltage lower than the battery voltage, capability of bidirectional operation (returning energy to the utility), ability to provide stand-alone AC power output, and ability to control reactive power. Disadvantages of this approach include a requirement for a relatively large common-mode filter due to absence of inductance associated with phase A of motor 16, a requirement for a relatively large contactor (K2) to handle full motor current during drive-mode operation, and an inability to accommodate three-phase power input at the Recharge Port. The physical size of the common-mode filter is proportionate to the product of the common-mode voltage and the RMS port current. The actual size of the common-mode inductor will depend upon details such as core material, heat transfer, and winding packing factor. A typical proportionality constant is in the range of 25 g/kVA to 100 g/kVA.

FIG. 4 is an electrical schematic diagram showing an integrated recharge scheme 40 with a two-pole contactor K2 to open a motor neutral "splice". With this scheme, no neutral splice is provided within the motor; both legs of each of the three motor windings are brought out. Two contactors (K1, K2) and a conventional EMI filter/recharge port 26 are added to the FIG. 1 inverter-motor 10 to establish the recharge function. When operated in the drive-mode, contactor K1 is open and two-pole contactor K2 is closed—thus reestablishing the FIG. 1 configuration.

In the recharge-mode, contactor K1 is closed and contactor K2 is open, while Q1 through Q6 provide synchronous rectification; motor leakage inductance is used to provide the required phase port inductance. Various PWM control schemes can be employed. In one such scheme, control is such that utility line currents for all three phases are maintained instantaneously proportionate to corresponding line voltages—thus providing unity power factor operation.

As before, maximum recharge power is generally determined by the motor rating. Typically, for single-phase charging with this approach, the maximum continuous recharge power is approximately 50% of the continuous drive-mode rating. For three-phase charging, the continuous rating jumps to about 80% of the drive-mode continuous rating.

Advantages of this approach include elimination of semiconductor components (e.g. the diode bridge 24 of FIG. 2), elimination of the motor neutral splice, ability to operate from any utility having a peak voltage lower than the battery voltage, ability to accommodate both single and three-phase utility power, capability of bidirectional operation, ability to provide stand-alone single phase and three phase AC power output, ability to control reactive power, and reduction of recharge common-mode currents due to topology symmetry—thus enabling the use of a smaller common-mode filter. Disadvantages of this approach include a requirement for a relatively large contactor (K2) which handles full motor current during drive-mode operation, and a requirement for six large motor lines in place of three large lines.

Overview

An integrated motor-drive and battery recharge apparatus includes a battery, an electric motor having N separate motor windings each having a first and a second leg, a contactor having a plurality M of poles, each pole having a first side and a second side, the inverter having 2N switching poles and a capacitor each coupled in parallel with the battery, and PWM control circuitry configured to control the state of each switching pole. Each leg of each motor winding is coupled to a phase node of a corresponding inverter switching pole, at least two of the motor winding legs (or taps thereof) are coupled to the corresponding first sides of the contactor poles, a power source/sink is coupled to the corresponding second sides of the contactor poles, and in one aspect a capacitor is coupled between each pair of contactor poles.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Example embodiments are described herein in the context of a method and apparatus providing an open delta motor drive with integrated recharge in an electrically powered vehicle. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Present state-of-the-art electric and hybrid vehicles typically combine a three-phase, voltage-fed bridge inverter with either a wye-wound permanent magnet motor or a wye-wound induction motor to achieve the required drive function. An alternative approach is to replace the three-phase inverter with a six-phase unit where each of the three motor phase windings is driven by two of the inverter phases. While this approach, termed herein the "open delta drive" adds some complexity, it provides benefits which include reduced ripple currents in the DC bus capacitor, reduced PWM losses within the motor, and the elimination of the motor neutral splice.

New power topologies are provided herein which extend the open delta scheme such that the inverter and motor provide, in addition to the function of a drive system, the function of a high-rate, unity power-factor battery charger.

Figure 5A:
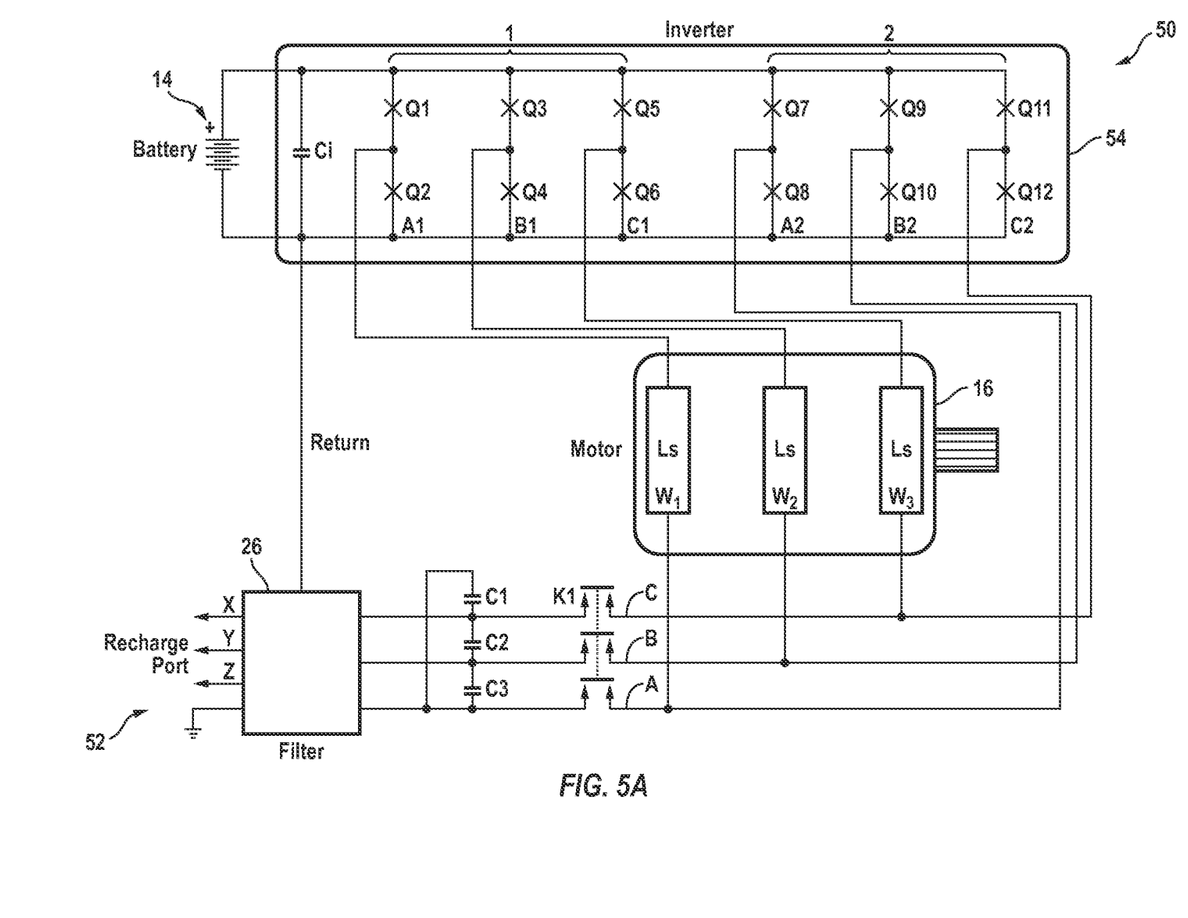
FIG. 5A is an electrical schematic diagram showing an open delta drive with integrated recharge in accordance with one embodiment of the present invention.
Figure 5B:
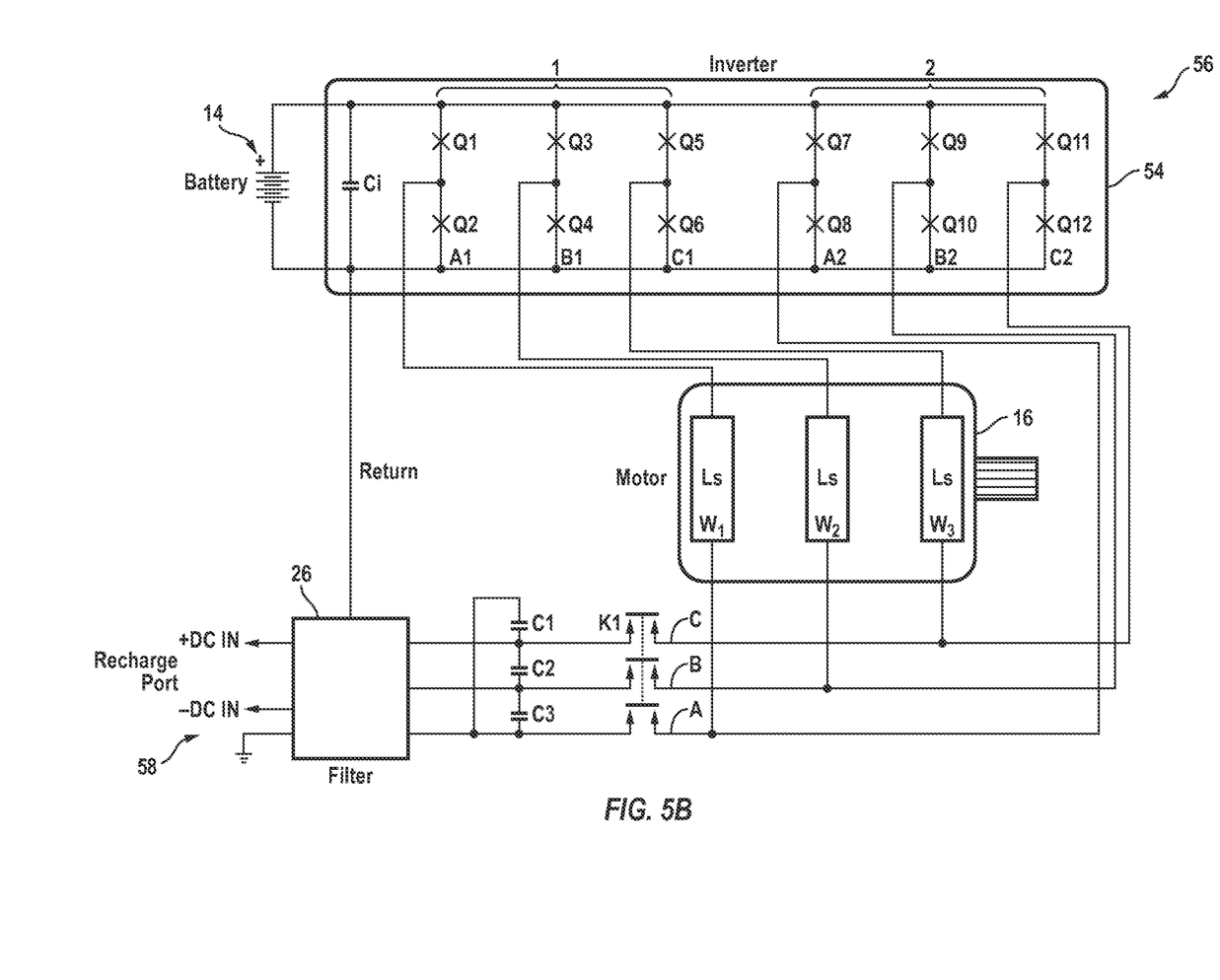
FIG. 5B is an electrical schematic diagram showing an open delta drive with integrated recharge in accordance with one embodiment of the present invention.
Figure 5C:
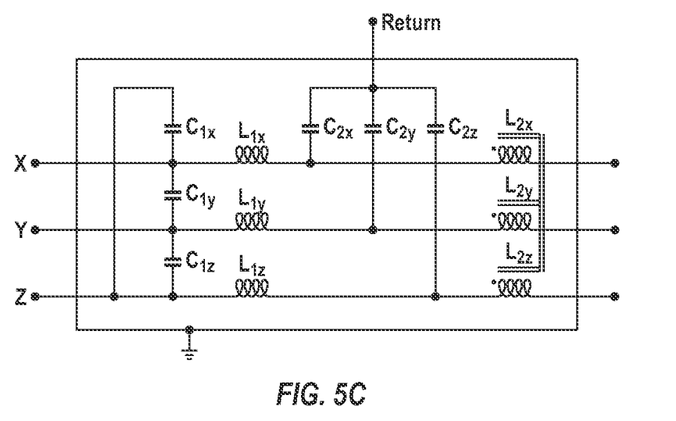
FIG. 5C is an electrical schematic diagram showing an EMI filter/recharge port for use with the circuits of FIGS. 5A, 6A and 7A in accordance with embodiments of the present invention.

FIG. 5A is an electrical schematic diagram showing an open delta drive circuit 50 with integrated recharge in accordance with one embodiment of the present invention. Circuit 50 is configured for three-phase (X, Y, Z) recharge at recharge port 52. FIG. 5B is an electrical schematic diagram showing an open delta drive circuit 56 with integrated recharge in accordance with another embodiment of the present invention. Circuit 56 is configured for DC (+,−) recharge at EMI filter/recharge port 58. FIG. 5C is an electrical schematic diagram showing EMI filter/recharge port 52 of circuit 50 (also port 62 of circuit 60 and port 72 of circuit 70) and FIG. 5D is an electrical schematic diagram showing EMI filter/recharge port 58 of circuit 56 (also port 66 of circuit 64 and port 76 of circuit 74) in accordance with embodiments of the present invention.

In FIG. 5C capacitors C1$x$, C1$y$ and C1$z$ together with inductors L1$x$, L1$y$ and L1$z$ form a differential-mode filter which serves to attenuate differential-mode voltage and current ripple. Capacitors C2$x$, C2$y$ and C2$z$ together with inductors L2$x$, L2$y$ and L2$z$ form a common-mode filter which serves to attenuate common-mode voltage ripple. L1$x$, L1$y$ and L1$z$ are separate components while L2$x$, L2$y$ and L2$z$ share a common magnetic core.

Figure 5D:
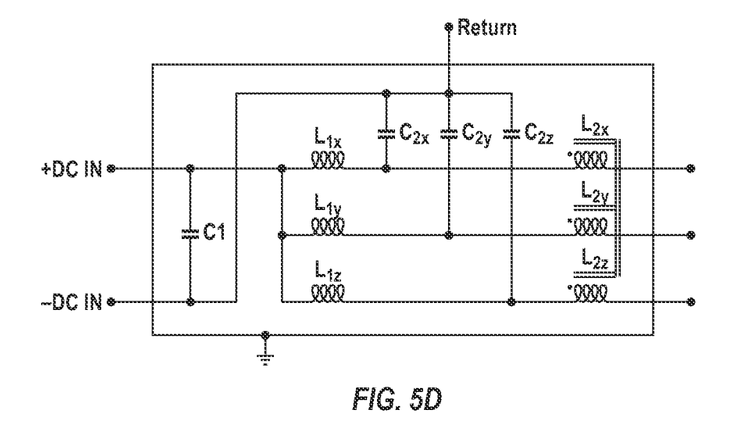
FIG. 5D is an electrical schematic diagram showing an EMI filter/recharge port for use with the circuits of FIGS. 5B, 6B and 7B in accordance with embodiments of the present invention.

In FIG. 5D, capacitor C1 together with inductors L1$x$, L1$y$ and L1$z$ form a differential-mode filter which serves to attenuate differential-mode voltage and current ripple. Capacitors C2$x$, C2$y$ and C2$z$ together with inductors L2$x$, L2$y$ and L2$z$ form a common-mode filter which serves to attenuate common-mode voltage ripple. L1$x$, L1$y$ and L1$z$ are separate components while L2$x$, L2$y$ and L2$z$ share a common magnetic core.

Figure 6A:
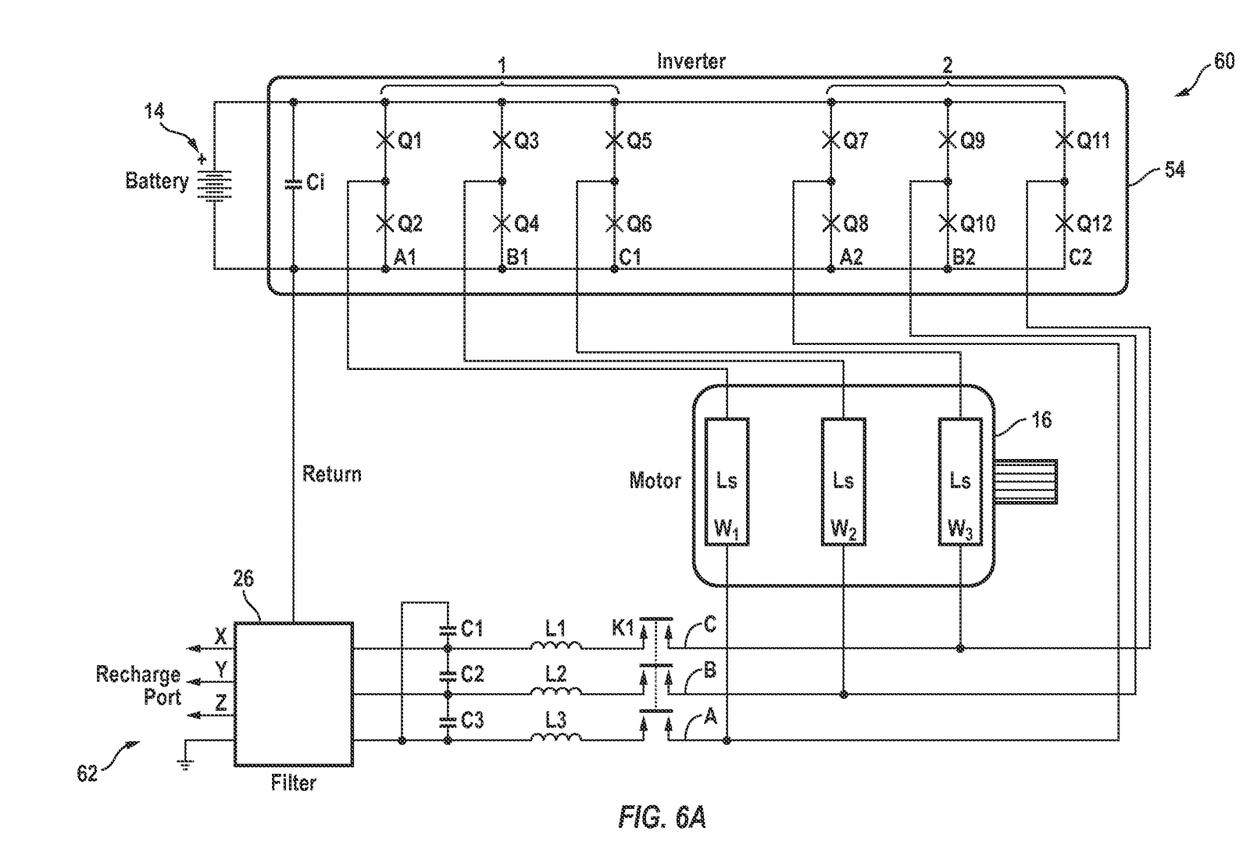
FIG. 6A is an electrical schematic diagram showing an open delta drive with integrated recharge in accordance with one embodiment of the present invention.
Figure 6B:
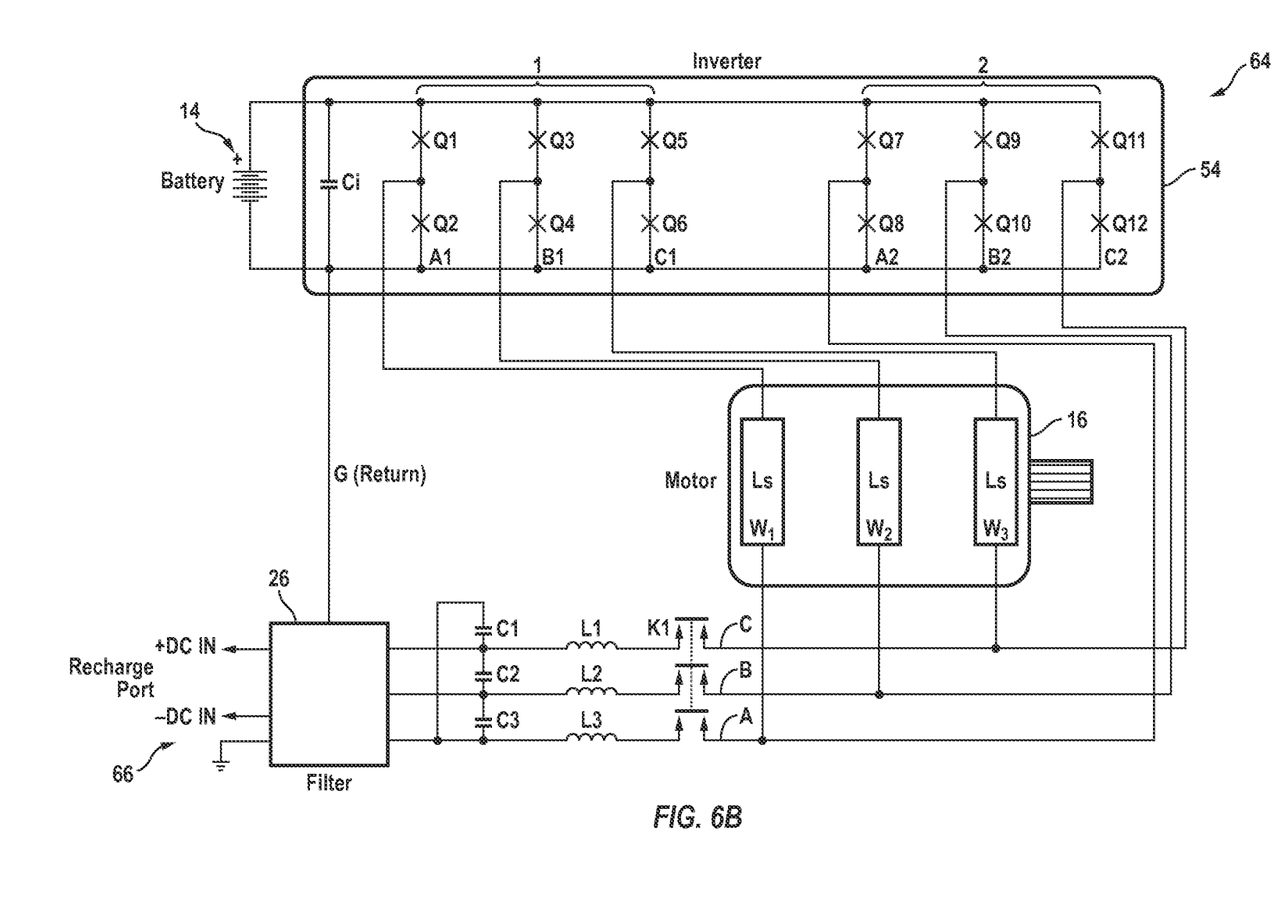
FIG. 6B is an electrical schematic diagram showing an open delta drive with integrated recharge in accordance with one embodiment of the present invention.

FIG. 6A is an electrical schematic diagram showing an open delta drive circuit 60 with integrated recharge in accordance with one embodiment of the present invention. Circuit 60 is configured for three-phase (X, Y, Z) recharge at EMI filter/recharge port 62. FIG. 6B is an electrical schematic diagram showing an open delta drive circuit 64 with integrated recharge in accordance with another embodiment of the present invention. Circuit 64 is configured for DC (+, −) recharge at EMI filter/recharge port 66. FIG. 5C is an electrical schematic diagram showing EMI filter/recharge port 62 of circuit 60 and FIG. 5D is an electrical schematic diagram showing EMI filter/recharge port 66 of circuit 64 in accordance with embodiments of the present invention.

Figure 7A:
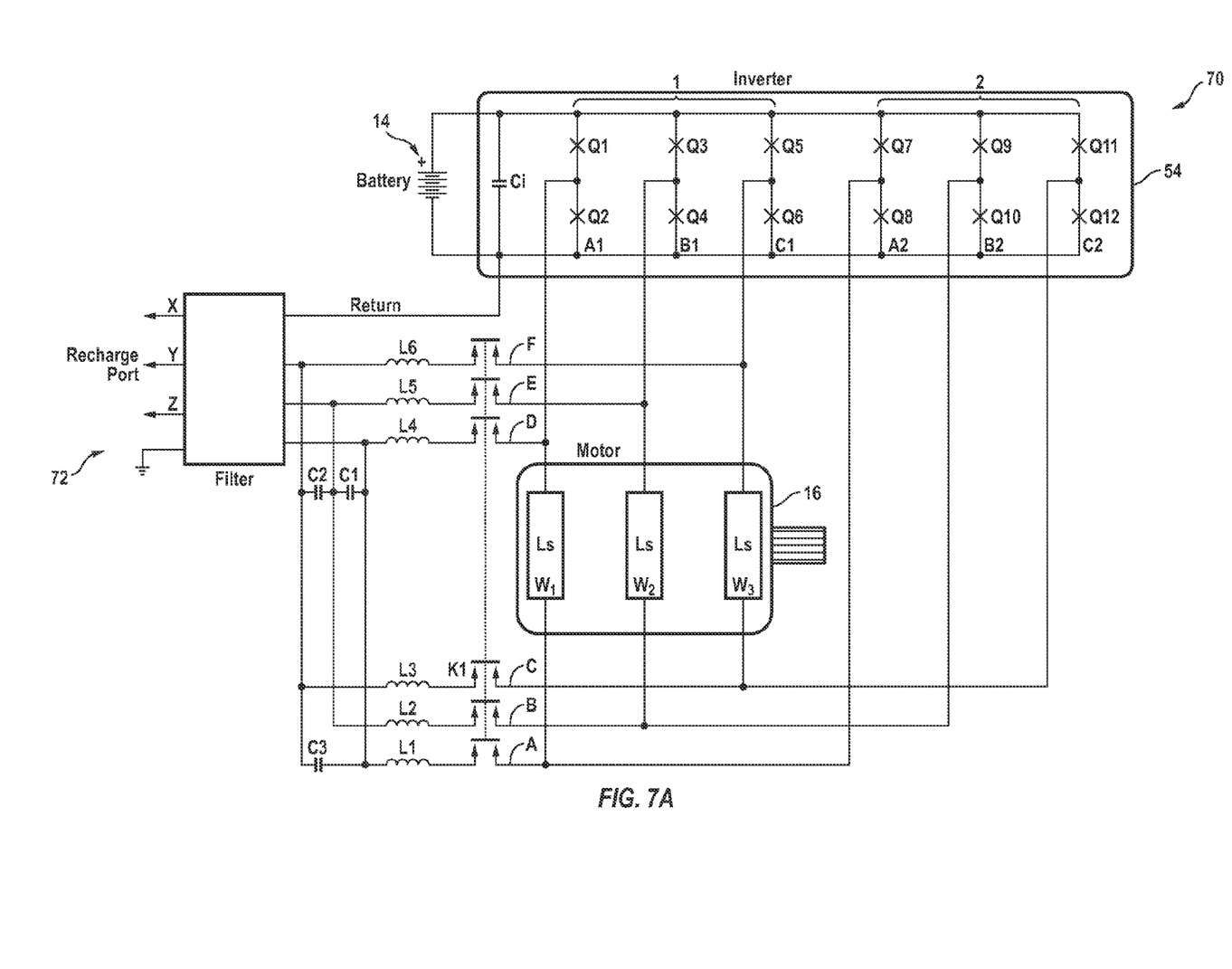
FIG. 7A is an electrical schematic diagram showing an open delta drive with integrated recharge in accordance with one embodiment of the present invention.
Figure 7B:
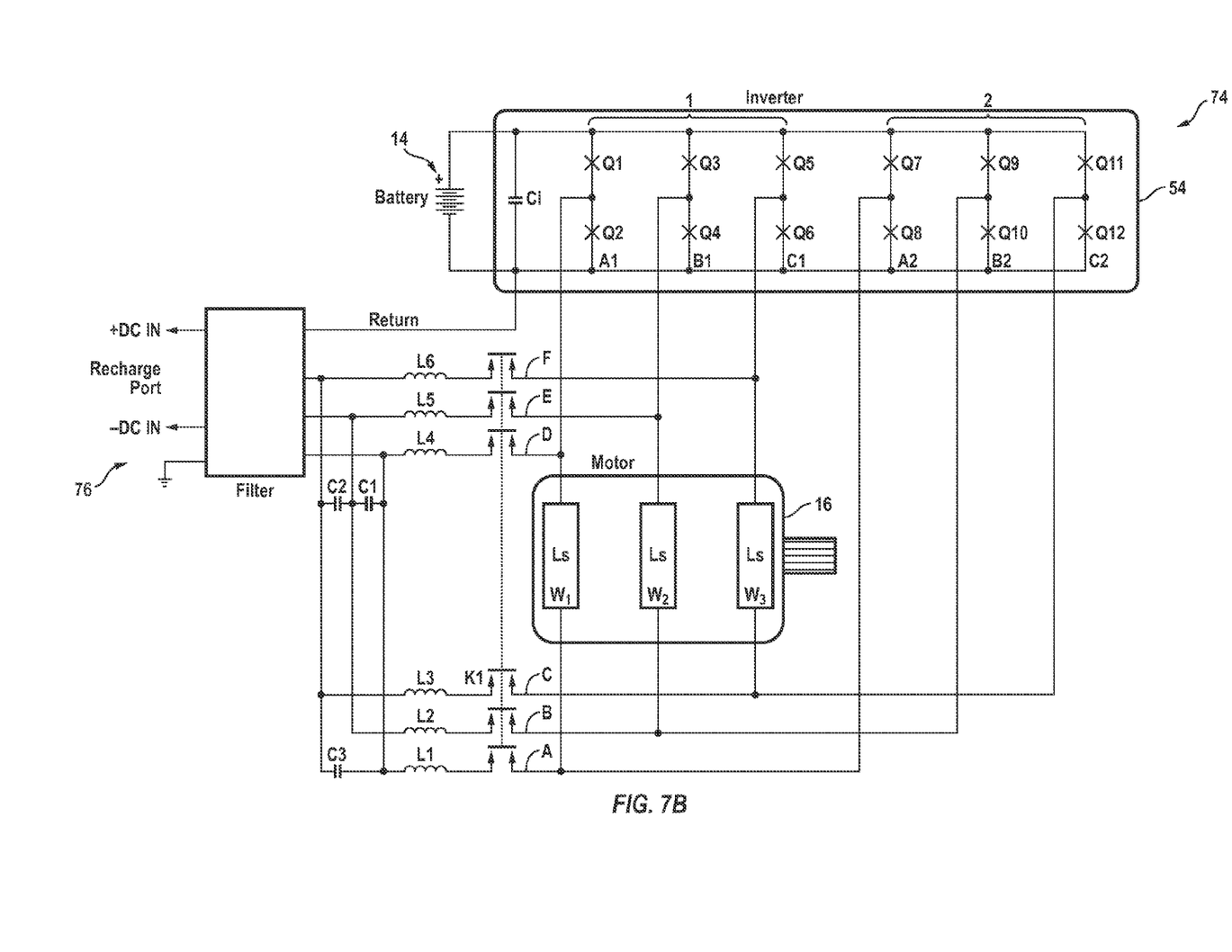
FIG. 7B is an electrical schematic diagram showing an open delta drive with integrated recharge in accordance with one embodiment of the present invention.

FIG. 7A is an electrical schematic diagram showing an open delta drive circuit 70 with integrated recharge in accordance with one embodiment of the present invention. Circuit 70 is configured for three-phase (X, Y, Z) recharge at EMI filter/recharge port 72. FIG. 7B is an electrical schematic diagram showing an open delta drive circuit 74 with integrated recharge in accordance with another embodiment of the present invention. Circuit 74 is configured for DC (+,−) recharge at EMI filter/recharge port 76. FIG. 5C is an electrical schematic diagram showing EMI filter/recharge port 72 of circuit 70 and FIG. 5D is an electrical schematic diagram showing EMI filter/recharge port 76 of circuit 74 in accordance with embodiments of the present invention.

In the circuits of FIGS. 5A, 5B, 6A, 6B, 7A, 7B and 10, a six-phase inverter 54 is coupled to three-phase motor 16 and powered by a battery (or other DC voltage source) 14. A DC bus input capacitor Ci (part of inverter 54) is coupled across battery 14. The six-phase inverter 54 is formed from twelve transistors arranged as switches (Q1-Q12). Each phase (Phase A1, Phase B1, Phase C1, Phase A2, Phase B2, Phase C2) providing power from the inverter 54 to the motor 16 is coupled to a center (phase) node of a pair of switches (switching pole) corresponding to the phase, i.e., Q1 and Q2 (A1), Q3 and Q4 (B1), and so on. Operation of the inverter for each embodiment shown in FIGS. 5A, 5B, 6A, 6B, 7A and 7B is the same and is described below.

In the circuits of FIGS. 5A and 5B lines A, B and C are coupled to the inverter as follows: line A is coupled to the center node of Phase A1 through winding W1 of motor 16 and to the center node of Phase A2 directly; line B is coupled to the center node of Phase B1 through winding W2 of motor 16 and to the center node of Phase B2 directly; and line C is coupled to the center node of Phase C1 through winding W3 of motor 16 and to the center node of Phase C2 directly. Each winding W1, W2 and W3 has essentially the same inductance Ls. Capacitor C1 is coupled between lines A and C; capacitor C2 is coupled between lines B and C, and capacitor C3 is coupled between lines A and B. Capacitors C1, C2 and C3 have substantially the same value. Contactor K1 is set to the OPEN state for normal drive mode operation and to the CLOSED state for recharge operation.

The FIG. 5A circuit has a three phase EMI filter/recharge port 52 detailed in FIG. 5C and the FIG. 5B circuit has a DC EMI filter/recharge port 58 detailed in FIG. 5D (as described above).

For each phase, Ls in combination with its associated capacitor forms a low-pass filter which effectively attenuates voltage and current harmonics generated by the switching action of Q1 through Q6.

In the circuits of FIGS. 6A and 6B lines A, B and C are coupled to the inverter as in the FIGS. 5A and 5B circuits. Capacitor C1 is coupled between lines A and C; capacitor C2 is coupled between lines B and C, and capacitor C3 is coupled between lines A and B. Capacitors C1, C2 and C3 have substantially the same value. Contactor K1 is set to the OPEN state for normal drive mode operation and to the CLOSED state for recharge operation. Inductor L1 is coupled between the capacitor C1/C2 node and the contactor node for line C; inductor L2 is coupled between the capacitor C2/C3 node and the contactor node for line B; and inductor L3 is coupled between the capacitor C1/C3 node and the contactor node for line A, as shown.

The FIG. 6A circuit has a three phase EMI filter/recharge port 62 detailed in FIG. 5C and the FIG. 6B circuit has a DC EMI filter/recharge port 66 detailed in FIG. 5D (as described above).

In the circuits of FIGS. 7A and 7B lines A, B and C are coupled to the inverter as in the FIGS. 5A and 5B circuits. Line D is coupled to the center node of Phase A1 directly, line E is coupled to the center node of Phase B1 directly, and line F is coupled to the center node of Phase C1 directly. Lines A, B, C, D, E and F are coupled to contactor K1 and through contactor K1 (when in a CLOSED state) to inductors L1, L2, L3, L4, L5 and L6, respectively. The non-contactor side of inductors L1 and L4, L2 and L5, and L3 and L6 are coupled together and to respective nodes of the EMI filter/recharge port. Capacitor C1 is coupled between the L1/L4 node and the L2/L5 node; capacitor C2 is coupled between the L2/L5 node and the L3/L6 node; and capacitor L3 is coupled between the L1 and L3 nodes on the non-contactor sides of the inductors.

The FIG. 7A circuit has a three phase EMI filter/recharge port 72 detailed in FIG. 5C and the FIG. 7B circuit has a DC EMI filter/recharge port 76 detailed in FIG. 5D (as described above).

Figure 8:
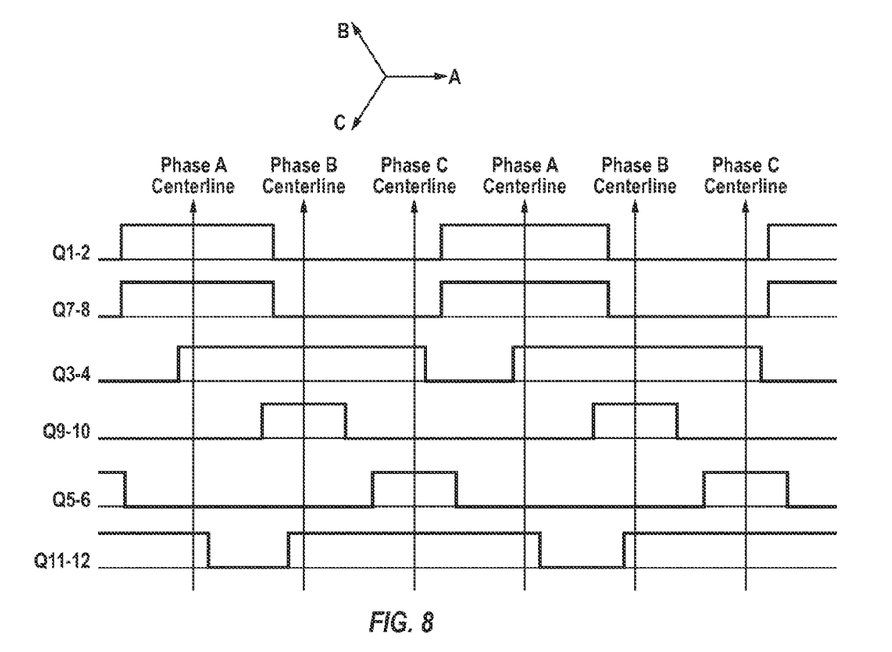
FIG. 8 is a timing diagram illustrating PWM switch commands for the open delta circuits of FIGS. 5A, 5B, 6A, 6B, 7A and 7B when operated in drive-mode in accordance with embodiments of the present invention.
Figure 9:
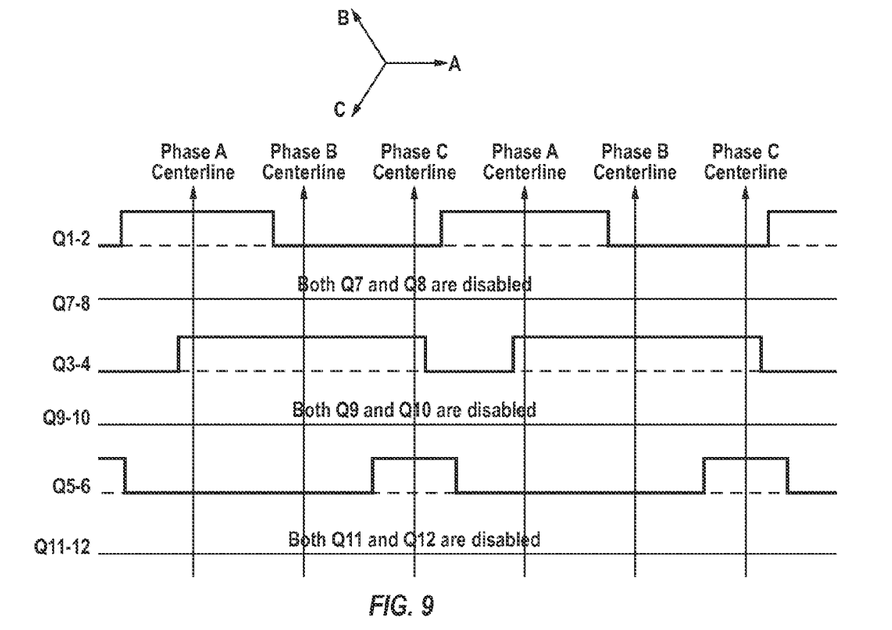
FIG. 9 is a timing diagram illustrating PWM switch commands for the open delta circuit of FIGS. 5A, 5B, 6A, 6B, 7A and 7B when operated in recharge-mode in accordance with embodiments of the present invention.

FIGS. 5A, 5B, 6A, 6B, 7A and 7B thus illustrate electrical circuits for open delta motor drives with integrated recharge in accordance with various embodiments of the invention. FIG. 8 is a corresponding timing diagram illustrating PWM switch commands for these open delta circuits when operated in drive-mode (contactor K1 in OPEN state) in accordance with the one embodiment. FIG. 9 is a corresponding timing diagram illustrating PWM switch commands for these open delta circuits when operated in recharge-mode (contactor K1 in CLOSED state) in accordance with the one embodiment.

This new integrated drive-recharge scheme uses the open delta inverter-motor configuration as its starting point. In the open delta configuration, each of the three motor phase windings has √3 times the number of turns as with the conventional wye configuration. Each winding is driven by a pair of inverter poles. Each pole has a current rating which is equal to 1/√3 times that of the conventional three-phase system. The modulation scheme is where each associated pair of poles is centerline modulated and where the centerlines for the three pole pairs are mutually displaced by 120 degrees (see, e.g., FIG. 8). An advantage of the open delta drive is the added level of current harmonic cancellation. This means that the bus DC bus input capacitor Ci can be smaller, while incurring lower losses. Another advantage is that the phase ripple currents are lower for a given switching frequency.

By adding one three-pole (or six-pole in the case of FIGS. 7A and 7B) contactor K1 and an EMI filter/recharge port circuit to the conventional open delta drive, a new power topology is realized which enables both DC, single-phase and three-phase charging of the battery—while preserving all of the drive-mode advantages of the open delta drive configuration.

In the drive-mode, contactor K1 is in the OPEN state and in the recharge-mode, contactor K1 is in the CLOSED state. In the drive-mode, all twelve semiconductor switches are used. In the recharge-mode, semiconductor switches Q1 through Q6 are each maintained off, while semiconductor switches Q7 through Q12 are controlled such that utility power is synchronously rectified to provide controlled charging of the battery (see, e.g., FIG. 9).

As before, maximum recharge power is generally determined by the motor rating. Typically, for single-phase operation, the maximum continuous recharge power for the FIGS. 5A, 5B, 6A, 6B, 7A and 7B approach is approximately 40% of the continuous drive mode rating. The maximum continuous recharge power for three-phase operation is approximately 70% of the continuous drive-mode rating.

Advantages of these embodiments include elimination of added semiconductor components (e.g., the FIG. 2 diode bridge 24), elimination of added contactor(s) (e.g., K2 in FIGS. 3 and 4), ability to operate from any utility having a peak voltage lower than the battery voltage, ability to accommodate both single and three-phase utility power, capability of bidirectional operation, ability to provide stand-alone single phase and three phase AC power output, ability to control reactive power, reduction of bus capacitor size when compared with conventional three-phase schemes, reduction of losses associated with bus capacitor when compared with conventional three-phase schemes, reduction of recharge common-mode currents due to topology symmetry—thus enabling the use of a smaller common-mode filter, capability of using lower switching frequencies in drive-mode—such that semiconductor switching losses are reduced, elimination of the motor neutral splice—such that end turn size is reduced, compared with the FIG. 3 scheme, motor core losses during recharge are significantly reduced due to increased number of turns associated with the delta winding. Disadvantages of these embodiments include addition of complexity (six phases in place of three); the number of gate drives is increased from six to twelve; the number of phase current sensors is increased from two to three; some minimal complexity is added to the controller, and compared with the FIG. 3 scheme, the recharge power rating may be lower due to the increased motor winding resistance associated with the delta configuration.

Figure 10:
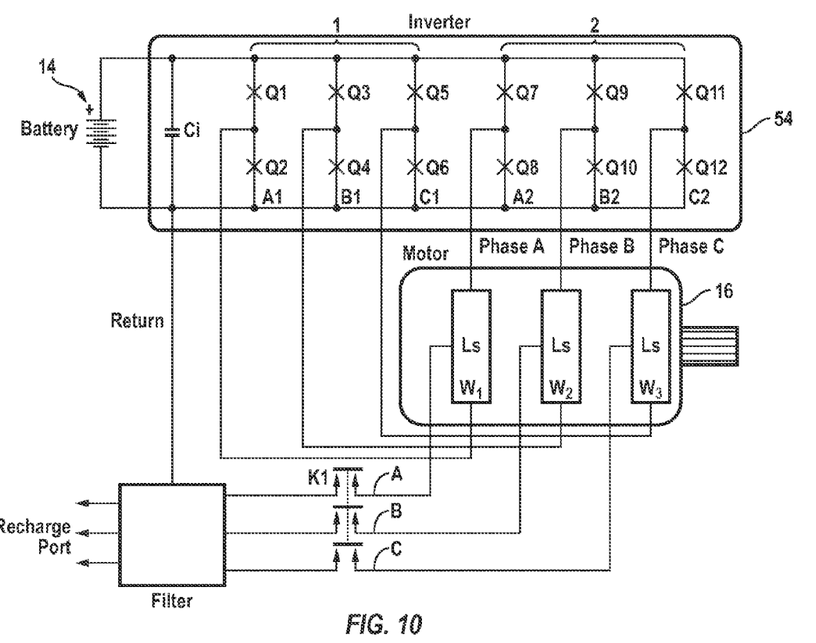
FIG. 10 is an electrical schematic diagram showing a modified open delta drive with integrated recharge in accordance with one embodiment of the present invention.
Figure 11:
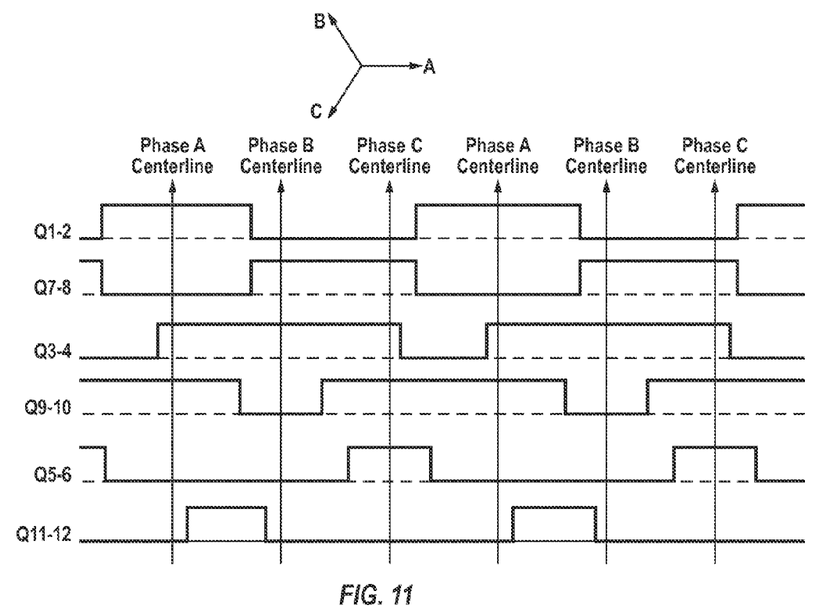
FIG. 11 is a timing diagram illustrating PWM switch commands for the modified open delta drive circuit of FIG. 10 when operated in recharge-mode in accordance with one embodiment of the present invention.

FIG. 10 is an electrical schematic diagram showing a further modified open delta motor drive with integrated recharge in accordance with one embodiment. FIG. 11 is a corresponding timing diagram illustrating PWM switch commands for the modified open delta motor drive circuit of FIG. 10 when operated in recharge-mode in accordance with the one embodiment. FIG. 8 corresponds to the timing of PWM switch commands for this embodiment when in drive-mode.

A modification of the schemes illustrated in FIGS. 5A, 5B, 6A, 6B, 7A, 7B (the "earlier schemes") is illustrated in FIG. 10 wherein recharge power is applied to motor winding center taps. With this modification, all twelve semiconductor switches are utilized during recharge and the recharge power rating is thereby doubled as compared with the earlier schemes; all other advantages of the earlier schemes are retained. Drive-mode switch commands for this embodiment are the same as shown in FIG. 8 and corresponding recharge-mode PWM switch commands are as shown in FIG. 11.

For each of the previously shown integrated recharge schemes, some level of motor torque is produced during recharge. Generally, this is considered to be a non-issue as it is assumed that a parking pawl is engaged whenever charging takes place. It is however of note that with the FIG. 10 scheme, essentially no torque is produced during recharge due to the symmetrical current split within each motor winding and thus no parking pawl is required during recharge.

With the FIG. 10 scheme, additional differential-mode inductance may be required to limit ripple currents. The magnitude of ripple currents associated with any semiconductor pole is inverse with the associated inductance. In turn, a loss component exists which is proportionate to the square of this current component. Accordingly, a minimum inductance is required such that the RMS ripple current is held to something on the order of about 10% of the fundamental phase current. In the case of the FIG. 10 scheme, the effective inductance (motor leakage inductance) is generally below the required threshold. In such cases, inductance must be added in series with the winding taps to overcome this limitation. This added inductance may be built into the EMI filter (see, e.g., FIGS. 5C, 5D).

Advantages of the FIG. 10 scheme include elimination of added semiconductor components (e.g., the FIG. 2 diode bridge 24), elimination of added contactor(s) (e.g., K2 in FIGS. 3 and 4), ability to operate from any utility having a peak voltage lower than the battery voltage, ability to accommodate both single and three-phase utility power, capability of achieving very high recharge rates due to the simultaneous use of all twelve inverter switches and use of the motor center tap whereby current paths are doubled, capability of bidirectional operation, ability to provide stand-alone single phase and three-phase AC power output, ability to control reactive power, reduction of bus capacitor size when compared with conventional three-phase schemes, reduction of losses associated with bus capacitor when compared with conventional three-phase schemes, reduction of recharge common-mode currents due to topology symmetry; this enables the use of a smaller common-mode filter, reduction of filter size since voltage and current switching components applied to the filter each have fundamental frequencies which are twice the switching frequency, capability of using reduced switching frequencies in drive-mode—such that semiconductor switching losses are reduced, elimination of motor neutral splice—such that end turn size is reduced. Disadvantages of the FIG. 10 scheme include some additional circuit complexity (six phases in place of three); the number of gate drives is increased from six to twelve; the number of phase current sensors is increased from two to three; some minimal complexity is added to the controller, and center taps are added to the motor windings—as compared with the earlier schemes. (In general, the gauge of these added wires will be smaller than the other six motor lines.), and increase in the magnitude of phase ripple currents due to the effective paralleling of motor leakage inductances. However, in all cases, where needed, this drawback can be mitigated by the use of increased differential-mode inductance within the EMI filter.

Note that while the figures show a three-phase motor and corresponding inverter, other numbers of phases could be used, e.g., 2, 4 and the like. Thus the term "polyphase" as used in the claims will refer to a number of phases greater than or equal to 2.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. An integrated motor drive and battery recharge apparatus, comprising:
   a battery;
   an electric motor having N separate motor windings each having a first and a second leg;
   a contactor having a plurality M of poles, each pole having a first side and a second side;
   a 2N pole bridge inverter, the inverter having 2N switching poles and a capacitor each of the 2N switching poles coupled in parallel with the battery;
   a capacitor coupled in parallel with the battery;
   a recharge port coupled to the second sides of the contactor poles;
   PWM control circuitry configured to control the state of each switching pole,
   wherein each leg of each motor winding is coupled to a phase node of a corresponding inverter switching pole, at least two of the motor winding legs are coupled to the corresponding first sides of the contactor poles, a power source/sink is coupled to the corresponding second sides of the contactor poles, and a capacitor is coupled between each pair of contactor poles and
   wherein the apparatus is configured so that:
   in a recharge-mode the contactor is closed and electrical current from the recharge port flows through the motor windings to the inverter and from the inverter to the battery, and
   in a drive-mode the contactor is open and electrical current from the battery flows through the inverter to the motor windings and is blocked from flowing to the recharge port by the open contactor.

2. The apparatus of claim 1, wherein:
   the recharge port includes an EMI filter.

3. The apparatus of claim 1, wherein M=N.

4. The apparatus of claim 1, wherein M<N.

5. The apparatus of claim 2, wherein the recharge port is configured to be coupled to a DC power source/sink.

6. The apparatus of claim 2, wherein the recharge port is configured to be coupled to an AC power source/sink.

7. The apparatus of claim 1, wherein an inductor is coupled between each second side of a contactor pole and the power source/sink.

8. The apparatus of claim 7, wherein:
   the recharge port includes an EMI filter.

9. The apparatus of claim 7, wherein M=N.

10. The apparatus of claim 7, wherein M<N.

11. The apparatus of claim 8, wherein the recharge port is configured to be coupled to a DC power source/sink.

12. The apparatus of claim 8, wherein the recharge port is configured to be coupled to an AC power source/sink.

13. An integrated motor drive and battery recharge apparatus, comprising:
    a battery;
    an electric motor having N separate motor windings each having a first and a second leg;
    a contactor having a plurality M of poles, each pole having a first side and a second side;
    a 2N pole bridge inverter, the inverter having 2N switching poles each of the 2N switching poles coupled in parallel with the battery;
    a first capacitor coupled in parallel with the battery;
    a recharge port coupled to the second sides of the contactor poles;
    PWM control circuitry configured to control the state of each switching pole,
    wherein each leg of each motor winding is coupled to a phase node of a corresponding inverter switching pole, at least two of the motor windings have taps which are coupled to the corresponding first sides of the contactor poles, and a power source/sink is coupled to the corresponding second sides of the contactor poles and
    wherein the apparatus is configured so that:
    in a recharge-mode the contactor is closed and electrical current from the recharge port flows through the motor windings to the inverter and from the inverter to the battery, and
    in a drive-mode the contactor is open and electrical current from the battery flows through the inverter to the motor windings and is blocked from flowing to the recharge port by the open contactor.

14. The apparatus of claim 13, further comprising:
    second capacitors coupled between each pair of contactor poles.

15. The apparatus of claim 13, wherein:
    the recharge port includes an EMI filter.

16. The apparatus of claim 13, wherein M=N.

17. The apparatus of claim 13, wherein M<N.

18. The apparatus of claim 15, wherein the recharge port is configured to be coupled to a DC power source/sink.

19. The apparatus of claim 15, wherein the recharge port is configured to be coupled to an AC power source/sink.

20. The apparatus of claim 14, wherein an inductor is coupled between each second side of a contactor pole and the power source/sink.

21. The apparatus of claim 20, wherein:
the recharge port includes an EMI filter.

22. The apparatus of claim 20, wherein M=N.

23. The apparatus of claim 20, wherein M<N.

24. The apparatus of claim 21, wherein the recharge port is configured to be coupled to a DC power source/sink.

25. The apparatus of claim 21 wherein the recharge port is configured to be coupled to an AC power source/sink.

26. The apparatus of claim 13 wherein the taps are center taps.

\* \* \* \* \*